Figure 1:
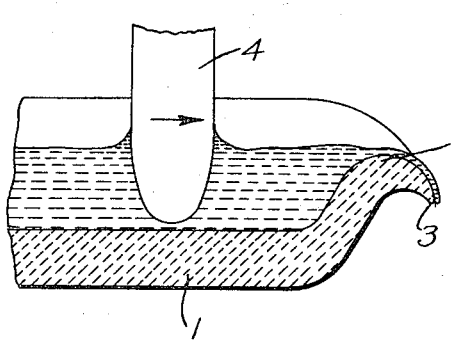

K. E. PEILER.
METHOD OF FEEDING MOLTEN GLASS.
APPLICATION FILED NOV. 28, 1916.

1,277,256.

Patented Aug. 27, 1918.
2 SHEETS—SHEET 2.

Witness:
E. L. Jarvis.

Inventor:
Karl E. Peiler:
by W. H. Honiss
Att'y.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

METHOD OF FEEDING MOLTEN GLASS.

1,277,256.  Specification of Letters Patent.  Patented Aug. 27, 1918.

Original applications filed August 6, 1912, Serial No. 713,538, and August 7, 1912, Serial No. 713,738. Divided and this application filed November 28, 1916. Serial No. 133,948.

*To all whom it may concern:*

Be it known that I, KARL E. PEILER, a citizen of the United States, residing at Hartford, in the county of Hartford and State of Connecticut, have invented new and useful Improvements in Methods of Feeding Molten Glass, of which the following is a specification.

This invention is an improved process or method of separating and feeding molten glass from a glass melting tank or furnace, or other container or source of supply, in uniform masses or gathers, delivered at uniform intervals of time to glass shaping molds, or to other devices, or for other purposes for which such uniform separating and feeding of molten glass is desirable.

In this invention the molten glass is caused to flow from its source of supply through and from an outlet in a succession of waves or surges, propagated by means of sweeps or displacers of refractory material operated in various ways, two of which are illustrated in the accompanying drawings. In one of these, illustrated in Figures 1 to 5 inclusive, the displacing member, herein designated a sweep or paddle, is moved horizontally forward and back through the glass, toward and from the outlet, its forward stroke raising the surface level of the glass adjacent to the outlet, and displacing the raised portion through the outlet, and preferably making its return stroke in a different and higher path. In the other apparatus, illustrated in Figs. 6 to 12 inclusive, a plurality of vertically moving displacers are employed, one of which segregates a portion of the glass in a pool adjacent to the outlet, while the other, descending into the segregated pool, displaces a desired amount of it by raising its surface level so that the amount of glass required for a gather flows from the outlet, whence it is delivered in any desired or convenient way to molds or other receptacles for shaping or otherwise treating the glass.

In so far as this application relates to the invention as illustrated in Figs. 1 to 5 inclusive, it is a division or continuation of my pending application Serial No. 713,538, filed Aug. 6, 1912, in which corresponding figures are shown and described in connection with claims for apparatus for carrying out this method; and in so far as this application relates to what is shown in Figs. 6 to 12 inclusive it is a division or continuation of my pending application Serial No. 713,738, filed August 7, 1912, in which corresponding figures are shown and described in connection with claims for apparatus for carrying out this method.

Figure 12:
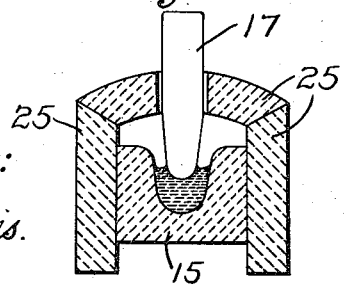

Figs. 1 to 5 inclusive are side views, in section taken approximately through the longitudinal center of the glass conveying conduit, showing the successive positions of the sweep or displacer, and thus illustrating the steps of its resulting operation. Figs. 6 to 11 inclusive are similar side views in section taken through the longitudinal center of the conduit, showing the successive movements of the displacers and the consequent propagation of the waves or surges of glass. Fig. 12 is an end view in reduced scale, in section taken on the line 12—12 of Fig. 6.

The container for the supply of glass which may be a pot or holder of any description, is shown in Figs. 1 to 5, as a conduit or forehearth 1 appurtenant to a melting tank or furnace, from which the glass flows along the conduit, and in which the glass is maintained at approximately uniform level, either as a result of the operations of a so-called continuous melting tank or by other well known means or methods. The outlet or discharging end of the conduit terminates in a low wall or dam 2, the top of which is approximately at the normal level of the glass in the conduit as shown in Fig. 1. The outer side of the wall or dam is provided with a depending apron or lip 3 to carry the glass clear of the end of the conduit. The conduit is preferably inclosed by a hood 25 (Fig. 12) to retain the heat, which may be augmented by a jet or flame of gas from one or more nozzles.

The molten glass is impelled toward the end of the conduit and over the dam in successive waves or surges, each containing the required volume or mass of glass for the desired drop or gather, the waves being propagated by means of a sweep 4 of refractory material, which projects from above into the glass and is carried forward and back therein as illustrated in Figs. 1 to 5 inclusive, the forward and backward movements of the sweep being preferably made in different paths, especially when working in a relatively narrow conduit, so that the sweep upon its return stroke passes over or by some of the forwardly flowing glass. Suitable mechanism for operating the sweep or paddle is shown in my prior application Serial No. 713,538 above referred to.

Figure 2:
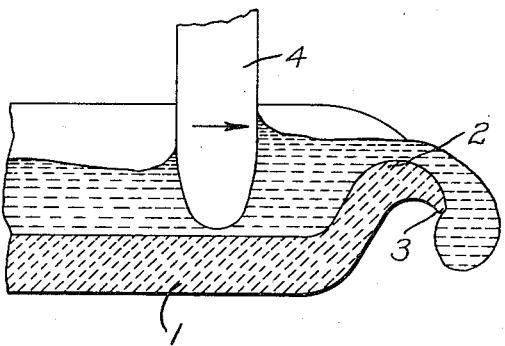
Figure 3:
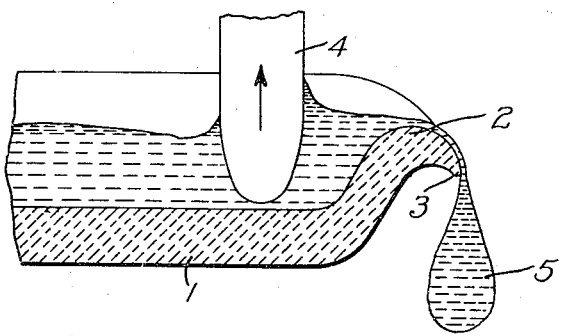
Figure 4:
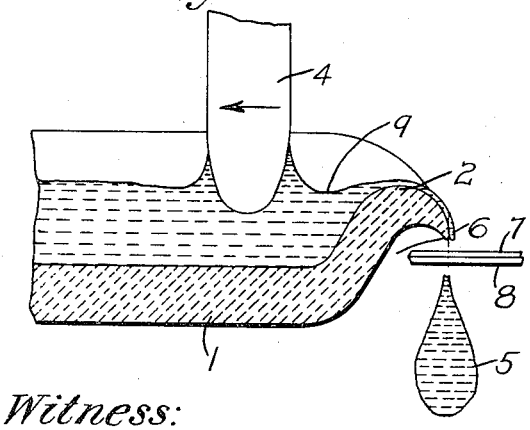
Figure 5:
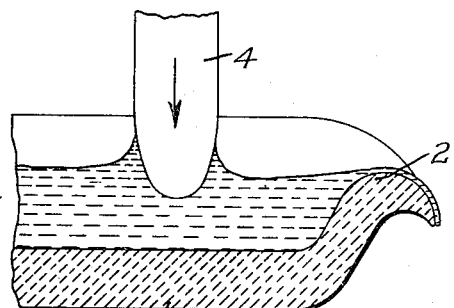
Figure 6:
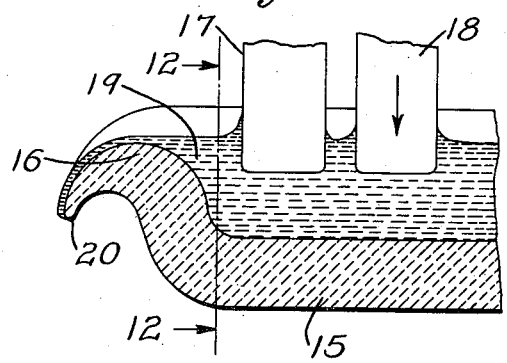
Figure 7:
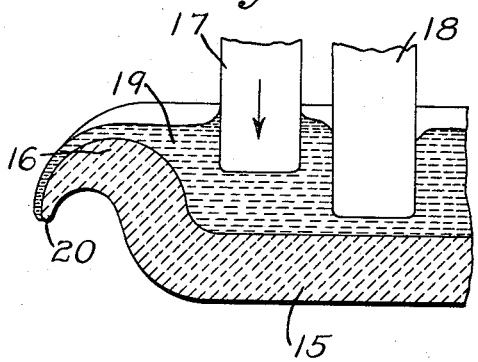
Figure 8:
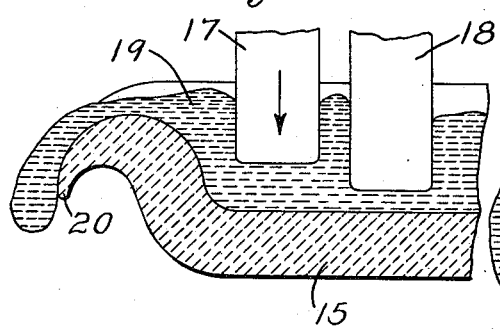
Figure 9:
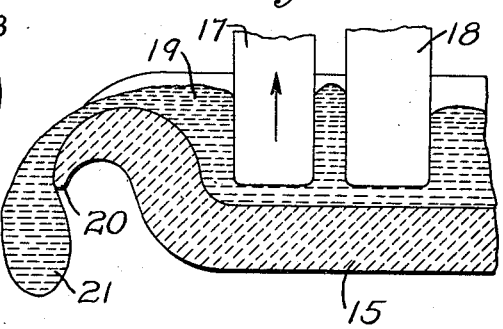

In the operation of this embodiment of my invention, the sweep 4 starting from its retracted and lower position illustrated in Fig. 1 is moved forward through the position shown in Fig. 2 to that of Fig. 3, pushing before it a suitable quantity of the glass in a wave-like formation, which surges over the dam 2 and settles down as shown in Fig. 3, in the form of a drop or gather 5, the suspending thread or cord 6 of which is then severed by any suitable means, as by the shear blades 7 and 8 shown in Fig. 4. Meanwhile the sweep has been raised, thus allowing the glass in front of it to sink down at 9 behind the dam, thereby checking the further flow of glass over the dam and serving to retract the glass and thus attenuate the connecting thread or cord 6. The heat confined by the inclosing hood above referred to, augmented when necessary by flame from suitable gas jets, maintains the glass in heated condition, so that the remaining stub of the severing thread or cord 6 is more or less reabsorbed into and incorporated with the succeeding wave of glass to be brought forward by the next active stroke of the sweep. Having thus delivered a drop or gather of the glass, the sweep moves back in the direction of the arrow shown in Fig. 4 to its retracted position shown in Fig. 5, from which it is then moved downwardly to the first position shown in Fig. 1, thus completing its cycle of operations and getting behind another quantity of glass, which meanwhile has flowed forward to fill up the depression left by the discharge of the previous wave. The arrows shown upon the sweep indicate the direction of its next movement from the respective positions shown in these figures.

The amount of glass fed may be varied by varying the width of the sweep, the length and rapidity of its forward stroke, and the depth of its dip into the glass.

The severed drops of glass may be delivered to the molds or other receptacles for which they are intended, either by falling directly into the molds, or by falling upon a chute or conveyer, by which the drops are transported to their destination. The length of the conduit may be proportioned and disposed so as to deliver the drops at the desired location. Or it may be short, projecting from the tank or other receptacle for the glass only far enough to form a lip to hold the suspended drops free from the side of the tank or container and prevent them from dripping down the side. In this case, the stroke of the sweep may extend backwardly into the tank, or into a pool of glass. In such an arrangement the sweep may be moved forward and back in the same path, since the glass is enabled to flow in front of the sweep from the sides of the path of movement of the sweep, when the latter is in its backward position.

The embodiment shown in Figs. 6 to 12 inclusive is also illustrated in connection with a conduit 15 like that of the previous figures, in and along which the glass flows from a melting tank or furnace or other source of supply. In this arrangement also the conduit is preferably inclosed by a hood 25 (Fig. 12) like that above referred to, to confine the heat of the glass, which may be regulated or augmented by suitable jets or flames of gas from one or more nozzles.

Figure 10:
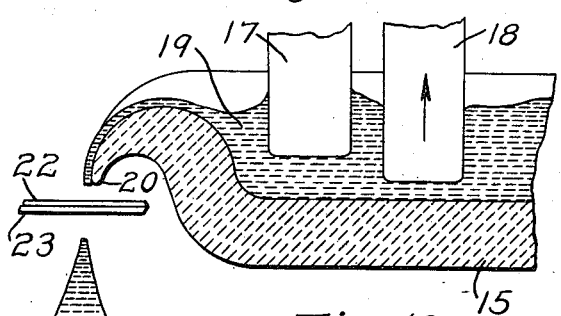
Figure 11:
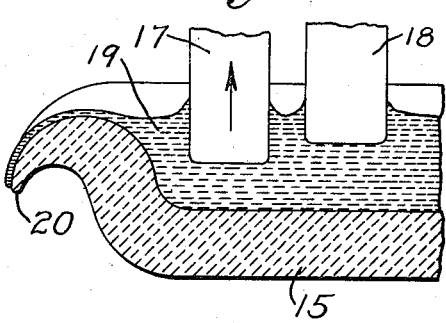

In this arrangement the successive waves or surges of glass are propagated and carried over the dam 16 by the operations of a plurality of displacers 17 and 18 made from refractory material, which project into the glass through a slot or slots in the hood above referred to, or through any inclosing top of the conduit or tank or container. These displacers are or may be operated by means of mechanism shown and described and claimed in my prior application Serial No. 713,738 above referred to. The succession of operations of the displacers is illustrated in the figures, in each of which the displacer which is next to be moved is indicated by an arrow pointing in the direction of its next movement. From the position shown in Fig. 1, the displacer moves down to the position shown in Fig. 7, and thus serves as a gate confining a pool of glass between it and the dam 16 sufficiently to prevent the free backward flow of glass from the pool 19, the height of which is also increased by the displacement of glass due to the downward movement of the gate displacer 18. This displacer 18 should when in its lowest position be only sufficiently close to the bottom and sides of the conduit to prevent undue backward flow of the glass. The viscosity of the glass permits of considerable clearance between the displacers and the conduit walls, which is desirable on account of the somewhat rough character of the refractory materials employed, and also because of the expansion and contraction of the parts due to the extreme temperature ranges to which they are subjected. From the position shown in Fig. 7 the displacer 17 moves downwardly to the successive positions shown in Figs. 8, 9 and 10, thus raising to the required height the level of the glass in the confined pool, and thereby further advancing the wave or surge of glass and flowing it over the top or dam to the other side thereof, where it settles, suspended from the lip 20 in the form of a drop or gather 21, which is then released by means of suitable shear blades 22 and 23 severing the thread or cord 24, as shown in Fig. 10. From the position shown in Fig. 10 the displacers move through the positions of Fig. 11 to their first position shown in Fig. 6, thus allowing more glass to flow from the tank of supply past the displacers to replace a quantity of glass equal to that previously displaced from the pool.

The width and depth of the conduit channel, the size of the displacer 17, and length of stroke or dip of the displacers should be proportioned to the size of the masses or gathers to be made.

The displacing devices and shearing mechanisms may be driven by, or in synchronism with, the mechanism of the adjunctive or coöperating machinery to which the gathers are to be delivered.

In various ways which will occur to those familiar with this art the operation of this method may be modified to suit different circumstances or conditions of service.

I claim as my invention:—

1. The method of feeding molten glass in successive equal compact charges from a container having an outlet communicating with the container above the normal level of the glass in the container, which consists in periodically raising the level of a determinate portion of the glass adjacent to the outlet sufficiently to discharge the desired charge therefrom in a compact mass through the outlet.

2. The method of feeding molten glass in successive equal compact charges from a container having an outlet communicating with the container above the normal level of the glass in the container, which consists in periodically raising the level of a determinate portion of the glass adjacent to the outlet, moving said portion through the outlet, suspending it from the outlet and severing the suspended portion from the remainder of the glass.

3. The method of feeding molten glass in successive equal compact charges from a container having an outlet communicating with the container above the normal level of the glass in the container, which consists in periodically raising the level of a determinate portion of the glass adjacent to the outlet, accumulating it into a drop suspended from the outlet, attenuating and severing the suspending neck or thread.

4. The method of feeding molten glass in successive equal compact charges from a container having an outlet communicating with the container above the normal level of the glass in the container, which consists in periodically raising the level of a determinate portion of the glass adjacent to the outlet, accumulating it into a drop suspended from the outlet, attenuating and severing the suspending neck or thread, and reversing the direction of movement of the glass within the outlet.

5. The method of feeding molten glass over a dam in successive equal compact charges which consists in periodically raising the free surface of the glass adjacent to the dam, discharging a portion of this glass over the dam, accumulating said portion into a charge suspended from the dam and severing the suspended charge from the remainder of the glass.

Signed at Hartford, Connecticut this 17th day of November, 1916.

KARL E. PEILER.